(No Model.)
C. A. MEISTER.
CHANGEABLE GEAR FOR BICYCLES.
No. 575,725. Patented Jan. 26, 1897.
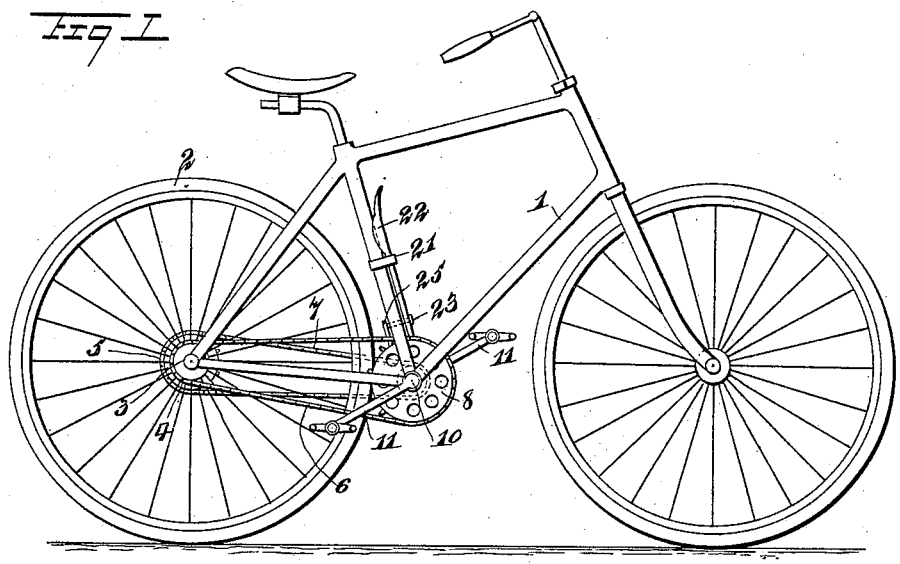
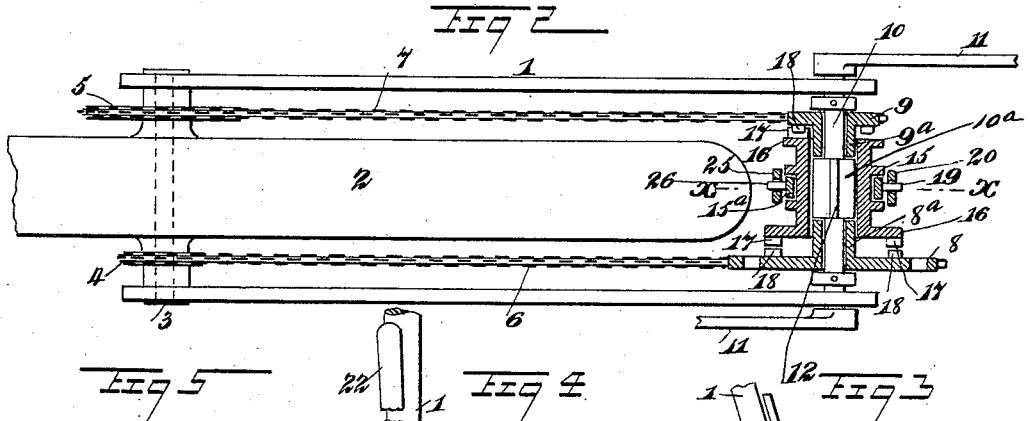

UNITED STATES PATENT OFFICE.

CHRISTIAN A. MEISTER, OF ALLENTOWN, PENNSYLVANIA.

CHANGEABLE GEAR FOR BICYCLES.

SPECIFICATION forming part of Letters Patent No. 575,725, dated January 26, 1897.

Application filed September 14, 1895. Serial No. 562,519. (No model.)

*To all whom it may concern:*

Be it known that I, CHRISTIAN A. MEISTER, of Allentown, in the county of Lehigh and State of Pennsylvania, have invented a new and Improved Changeable Gear for Bicycles, of which the following is a full, clear, and exact description.

This invention relates to certain improvements in changeable driving-gear for bicycles, and has for its object to provide a changeable gear of a simple and inexpensive character which shall be compact, durable, and light in construction and arranged in such a manner as to be adapted to be conveniently applied for use to bicycles of all kinds.

The invention contemplates certain novel features of the construction and combination and arrangement of the several parts of the device, whereby certain important advantages are attained and the device is made simpler, cheaper, more compact and durable and is otherwise better adapted and more convenient for use than various other similar devices heretofore employed, all as will be hereinafter fully set forth.

The novel features of the invention will be carefully defined in the claim.

Reference is to be had to the accompanying drawings, forming a part of this specification, in which similar characters of reference indicate corresponding parts in all the figures.

Figure 1 is a general view drawn to a small scale and showing a bicycle provided with my improved driving-gear. Fig. 2 is an enlarged fragmentary plan view of the gearing, the sprocket-wheels and clutch-sleeve on the crank axle or shaft being shown in section. Fig. 3 is a sectional detail view taken through the crank-axle and clutch-sleeve thereon in the plane indicated by the line $x\ x$ in Fig. 2. Fig. 4 is a fragmentary front view showing the sprocket-wheels and connected devices on the crank-axle. Fig. 5 is a somewhat similar view showing a modified arrangement of the device.

In the views, 1 represents the frame of the bicycle, which may be of any construction, and 2 represents the rear driving-wheel thereof, having its hub 3 provided at opposite ends with sprocket-wheels 4 and 5, the wheel 5 being of greater diameter than the wheel 4, as clearly seen. The sprocket-wheels 4 and 5 mesh with chains 6 and 7, respectively, which also mesh with large and small sprocket-wheels 8 and 9, mounted to turn loosely on opposite ends of the crank-shaft 10, having pedal-cranks 11 at its ends adapted to be operated by the feet of the rider in the usual way.

The sprocket-wheels 8 and 9 are provided, respectively, with projecting hubs $8^a$ and $9^a$, which abut at their inner ends against an enlarged central portion $10^a$ of the crank-shaft 10, said enlarged central portion being provided with a projecting longitudinal key or rib 12, engaging a slot or groove 13, formed in the interior of a clutch-sleeve 14, carried on the crank-shaft 10 between the sprocket-wheels 8 and 9 and capable of sliding movement longitudinally thereof.

The ends of the clutch-sleeve 14 overlap the inner ends of the hubs $8^a$ and $9^a$ of the sprocket-wheels 8 and 9, and are provided with projecting disks 16, having on their outer faces, or those faces adjacent to the said sprocket-wheels 8 and 9, projecting lugs 17, arranged to engage, when said sleeve 14 is moved longitudinally of the shaft, with similarly-formed lugs or projections 18 on the adjacent sides of said sprocket-wheels, whereby it will be seen that when the clutch-sleeve 14 is moved in one direction the sprocket-wheel 9 will be locked to turn with the crank-shaft, so as to drive the wheel 2 of the bicycle at a very slow speed, but powerfully, and when the said sleeve is moved in the other direction the sprocket-wheel 8 will be locked to turn with the crank-shaft, so as to drive the wheel 2 at a high speed, but less powerfully.

At its central portion the sleeve 14 is provided with a circumferential recess or groove $15^a$, arranged to receive a loose collar 15, having at one side a pin 19, engaging a recess in one end of a clutch-lever 20, having its upper end formed into a handle 22 and guided and laterally movable in a clip 21 on the frame 1 of the bicycle. The lever 20 is fixed to a pivot pin or bolt 23, engaging and turning in a recess 24 in the frame 1, and having fixed to its rear end an arm 25, which extends down into position to receive a pin 26 on the collar 15 and similar to the pin 19 thereon.

The handle 22 is held by its own elasticity in engagement with the opposite sides of the vertical brace-bar of the frame 1, whereby it will be seen that the handle is held against movement when either of the gears 8 or 9 is in operation. When it is desired to change the gear, it is only necessary to press the handle 22 out of engagement with the side of the frame and to push said handle across the frame and allow it to swing into engagement with the other side of the same, whereby the handle will be securely held against movement. In this way it will be seen that the lever 20 extends up along the vertical bar of the bicycle-frame into position to be conveniently manipulated by the rider, and the rider can at any time, by simply moving said lever from one position to the other, change from a low to a high gear without getting off the machine. In this way it is possible to secure all the advantages of both a high and low geared wheel, with none of the disadvantages and with but little increased weight and cost.

It will be obvious from the above description of my invention that the same is susceptible of considerable modification without material departure from the principles and spirit of my invention, and for this reason I do not wish to be understood as limiting myself to the exact form of the various parts herein set forth. For example, it may in some cases be desirable to employ the construction shown in Fig. 5, wherein the sprocket-wheel 27 is shown provided with a recess 28, which will be formed to receive and fit a pin 29 on the flange or disk 16 of the clutch-sleeve 14.

Having thus described my invention, I claim as new and desire to secure by Letters Patent—

In a bicycle, the combination of a frame having a vertical brace-bar, the lower end of which is forked and provided with a perforation extending through it, a driving-wheel having sprocket-wheels at opposite sides, a crank-shaft mounted to turn in the lower ends of the forks of the vertical bars of the frame and having pedal-cranks, sprocket-wheels loose on the ends of the crank-shaft and provided with clutch-faces on their inner sides, chains passing over the sprocket-wheels on the crank-shaft and driving-wheel, the sprockets at opposite sides of the bicycle being differently proportioned, a clutch-sleeve keyed on and slidable along the crank-shaft between the sprocket-wheels and provided at its ends with clutch-faces arranged when the sleeve is moved to engage the clutch-faces on the inner sides of the sprocket-wheels, said sleeve being provided with a central circular groove, a collar loose in said groove, pins projecting from opposite sides of the collar, a lever extending up along the vertical brace-bar of the frame and having its lower end engaging one pin, said lever being provided with a pivot-pin extending through the perforation in the frame, and an arm on said pivot-pin on the side of the frame opposite to the lever, said arm being arranged to move with the lever and being in engagement with the other pin on the collar, the upper end of said lever being elastic and being provided with a handle arranged to be held by the elasticity of the lever in engagement with the opposite sides of the vertical brace-bar of the frame when the lever is moved pivotally, substantially as set forth.

CHRISTIAN A. MEISTER.

Witnesses:
OLIVER A. JOBST,
CHAS. A. RUPERT, Jr.